W. J. KELLS.
JACKET FOR TANKS.
APPLICATION FILED SEPT. 30, 1912.
1,071,557.
Patented Aug. 26, 1913.
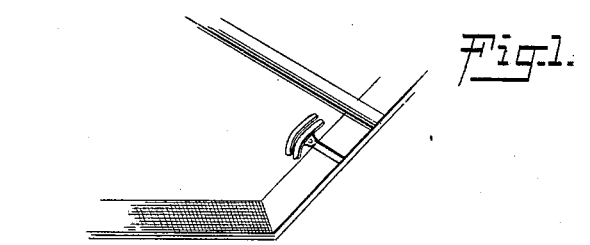
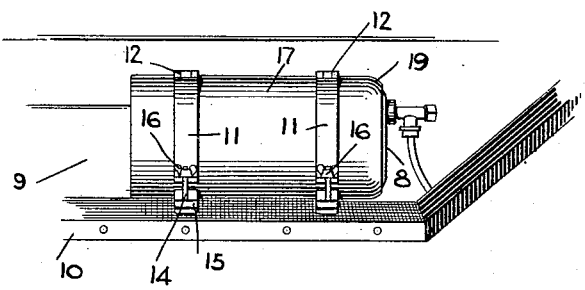
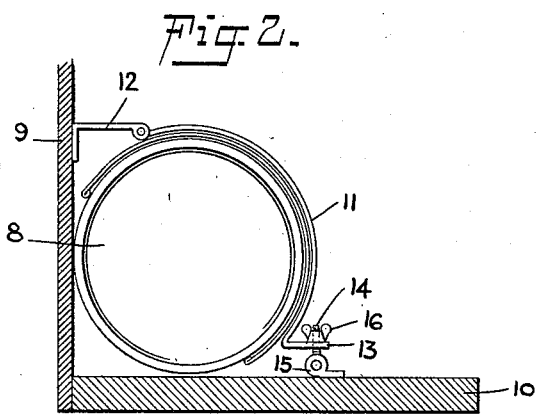
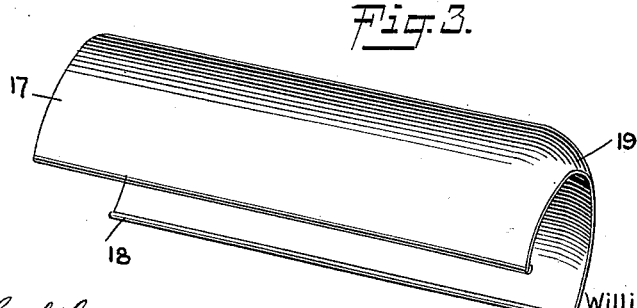
WITNESSES
William P. Goebel.
C. F. Murdock
INVENTOR
William J. Kells
BY Munn & Co
ATTORNEYS

UNITED STATES PATENT OFFICE.

WILLIAM J. KELLS, OF JERSEY CITY, NEW JERSEY.

JACKET FOR TANKS.

1,071,557.  Specification of Letters Patent.  Patented Aug. 26, 1913.

Application filed September 30, 1912. Serial No. 723,188.

*To all whom it may concern:*

Be it known that I, WILLIAM J. KELLS, a citizen of the United States, and a resident of Jersey City, in the county of Hudson and State of New Jersey, have invented a new and Improved Jacket for Tanks, of which the following is a full, clear, and exact description.

Among the principal objects which the present invention has in view are:—To provide a temporary cover or jacket for tanks or similar articles, and more particularly for the exposed gas-tanks commonly used in connection with automobiles, for supplying the head-lights thereof; to provide a jacket or cover of the character mentioned, arranged to be readily and quickly disposed in operative position; and to provide a jacket arranged to avoid interference with the tank-anchoring devices with which automobiles are ordinarily supplied.

Reference is to be had to the accompanying drawings forming a part of this specification, in which similar characters of reference indicate corresponding parts in all the views, and in which—

Figure 1 is a pictorial view, showing in its service relation a gas-tank having applied thereto a cover or jacket constructed and arranged in accordance with the present invention; Fig. 2 is an end view of the tank referred to, the jacket therefor and tank-anchoring device, the side bar and running board of an automobile being shown in section; and Fig. 3 is a detail view in perspective, of a cover or jacket constructed in accordance with the present invention.

While the herein-described jacket is adapted for use in conjunction with any exposed receptacle, I have shown the same as forming a protecting cover for a cylindrical tank of the type known as the "Presto gas tank," used as a reservoir for gas employed for illuminating the head or search-lights of the automobile whereon the tank is carried.

The tank 8, as usually employed, is held in the angle between the side bar 9 and the running board 10 of an automobile, by means of straps 11. The straps 11 are hinged upon brackets 12, and are provided with ends 13 slotted to pass a swing-bolt 14. The bolt 14 is hinged to a plate 15, and is provided with a wing nut 16, the heads whereof each rest upon an end 13 of the strap 11 to force the same downward when the nuts are manipulated.

The jacket 17 is constructed from a sheet of spring metal set to a diameter less than the diameter of the tank.

When employing the jacket 17, the same is expanded sufficiently, and is then passed over the tank 8. The spring of the metal from which the jacket is constructed closes the same tightly upon the tank, and thereafter during service, forms to all intents and purposes, a skin or cover for the tank. The longitudinal edges 18 of the jacket 17 are curled as shown in the drawings, while the forward end 19 of the jacket is slightly contracted or domed to conform to the forward end of the tank 8. The jacket 17, as seen best in Fig. 2 of the drawings, does not completely cover the tank 8, but extends thereabout to conceal the portion of the tank not otherwise concealed by the structure of the automobile; or, in other words, the jacket 17 extends somewhat more than half about the tank, so that the spring of the metal of the jacket clasps the tank. When now the tank 8 thus covered is installed in position, the straps 11 are lowered over and in contact with the jacket 17. When the straps 11 are clamped rigidly in position by manipulating the bolt 14 and nut 16, the jacket 17, as well as the tank 8, is held firmly in service position.

It is obvious that the jacket 17 serves a valuable purpose. Under usual conditions, the supply of the gas in the tanks 8, to operators of automobiles, has the disagreeable feature that the tanks, of necessity, are delivered without reference to condition or appearance. This results often in producing the incongruous appearance of a handsomely burnished or fitted automobile having on the running board and in a conspicuous location, a tank which is unkempt or dingy in appearance.

When employing the jacket 17 disclosed in the present application, this is avoided, for, as the jacket 17 would form a part of the equipment of an automobile, the same would receive equal attention to the rest of the equipment. When thus supplied, the appearance of the automobile would be in no way marred by the condition or appearance of the tank 8 furnished with the gas-supply.

Having thus described my invention, I claim as new and desire to secure by Letters Patent:—

As an article of manufacture, a resilient sheet metal segmental jacket to cover a fragmental portion of a tank, said jacket being normally set to a curve having a smaller diameter than said tank.

In testimony whereof I have signed my name to this specification in the presence of two subscribing witnesses.

WILLIAM J. KELLS.

Witnesses:
E. F. MURDOCK,
PHILIP D. ROLLHAUS.

Copies of this patent may be obtained for five cents each, by addressing the "Commissioner of Patents, Washington, D. C."